April 23, 1968    B. O. ANDERSON    3,378,983
MOLDING FASTENER
Filed Nov. 29, 1966
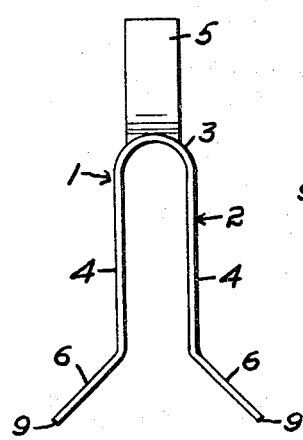
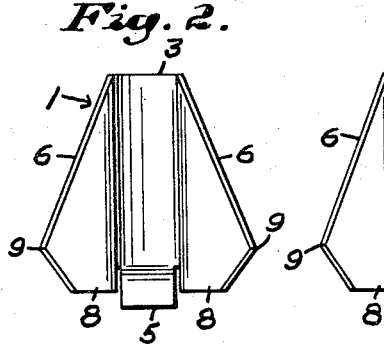
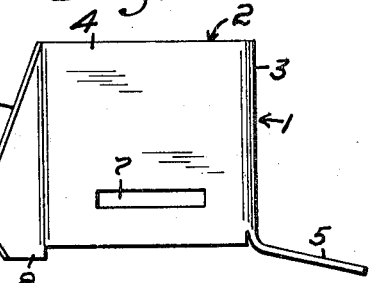
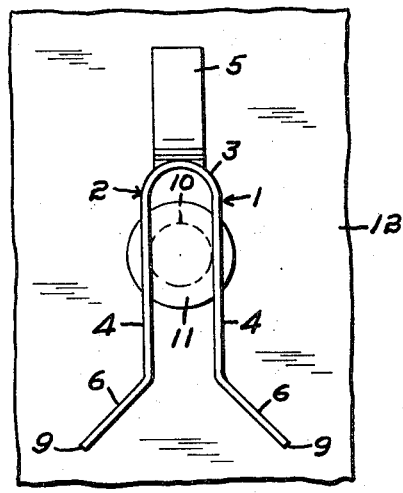
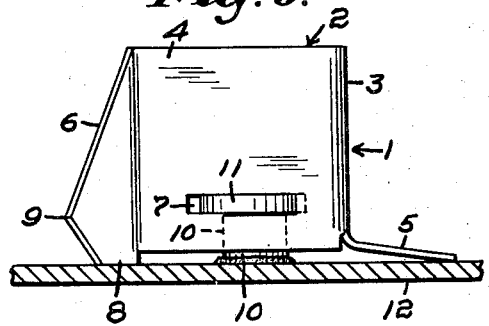
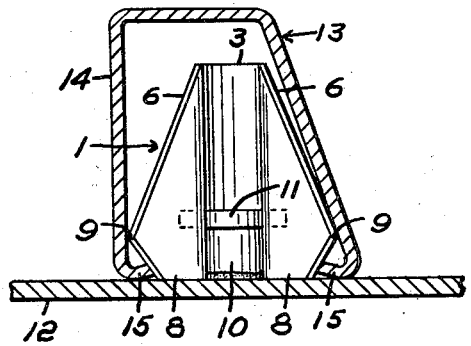
Inventor:
Bert Olaf Anderson
by James R. O'Connor
Atty.

United States Patent Office 3,378,983
Patented Apr. 23, 1968

3,378,983
MOLDING FASTENER
Bert O. Anderson, Allston, Mass., assignor to United-Carr Incorporated, Boston, Mass., a corporation of Delaware
Filed Nov. 29, 1966, Ser. No. 597,620
8 Claims. (Cl. 52—718)

ABSTRACT OF THE DISCLOSURE

A fastener combination for securing a trim piece, for example, a molding, to a vehicle body panel including a headed stud and a resilient sheet metal clip adapted to snappingly engage the stud and the trim piece. The clip has particular application where the stud is secured to the body panel without perforation of the latter, for example, by welding.

Background of the invention

The invention is concerned with trim fasteners for attaching decorative moldings to a support such as the body panel of a vehicle or an appliance housing, and the combination of a support, the fastener, and a trim piece. While the novel clip might well be employed in conjunction with a headed bolt or screw, it is seen to have special application for use with a headed stud which is welded to the surface of the support.

The best known prior art in the field is found in U.S. Patents 3,153,468; 3,188,730; 3,239,988; and 3,235,929 wherein the advantages of fastening without perforation of a support are explicitly set forth.

The '468 patent discloses an assembly wherein a smoothly contoured stud is welded to an auto body panel and the molding is secured by an adapter having resilient legs which clamp over the stud in the manner of a snap fastener. While this combination has proved effective for use in static installations, the adapter must be pre-attached to the molding section prior to snap engagement with the stud, and the engagement of the adapter with the stud relies solely on the spring tension of the adapter arms.

In order to provide for a more positive engagement of the fastener assembly, designers have later adopted studs having a head and a shank wherein the head has a pronounced circumferential overhang with respect to the shank. Studs of this latter type are utilized in the '730, '988 and '929 patents. In the '730 and '988 patents, the adapter is formed from a resilient plastic material and the engagement of the stud is accomplished by passing its head into a keyhole-shaped slot and forcing the adapter laterally so that it is in effect trapped between the head of the stud and the supporting panel. The effectiveness of this particular adapter is in no small measure due to the inherent resiliency and compressibility of the material from which it is formed. However, one will appreciate that plastic adapters generally lack the strength of a metal component and are often unacceptable for use in a high temperature environment.

The '929 patent discloses a sheet metal adapter which is used with a headed stud. While the engagement of the stud and adapter is more positive than that found in the '468 patent discussed above, one will observe that the adapter engages only the head of the stud on opposed sides thereof and, as the patentee notes, there is lost motion between the stud and the adapter. Further the adapter must be pre-attached to the molding both due to its design and to preclude lateral sliding movement of the snap legs in a direction parallel to same.

Summary of the invention

From the foregoing considerations of the prior art it becomes obvious that the need for a simple, efficient sheet metal molding clip or adapter which need not be pre-attached to the molding and which positively and securely engages a headed stud still exists. The principal object of the present invention is to provide such a fastener, as will become evident from a reading of the following detailed description in conjunction with a viewing of the accompanying drawing described below.

Brief description of the drawing

FIG. 1 is a top plan view of a sheet metal clip according to the invention;
FIG. 2 is an end view of the clip looking on its open end;
FIG. 3 is a side elevation of the clip;
FIG. 4 is a top plan view of an installation depicting the clip secured to a headed stud which is welded to a supporting panel;
FIG. 5 is a side elevation of the installation depicted in FIG. 4; and
FIG. 6 is an end view of the installation shown in FIGS. 4 and 5 with a molding (in section) snapped over the clip.

Description of the preferred embodiments

The clip 1 is a carbon steel stamping which is blanked, formed, heat treated and dry carborized and includes a generally U-shaped body portion 2 having a closed end 3 and generally parallel sides 4, a resilient tab 5 extending outwardly and downwardly from the lower edge of the closed end 3 between imaginary planes forming extensions of the sides 4, and a pair of side wings 6 which extend angularly in opposite directions from the ends of the sides adjacent the open end of the body portion. The sides 4 are provided with opposed longitudinal slots 7 which are generally equidistant from the open and closed ends of the body portion 2. The wings 6 have an irregular polygonal shape and each extends slightly below the lower edges of the sides 4 to provide support engaging feet 8. The edges of each of the wings remote from the body portion 2 are alternately diverging and converging between their lower ends adjacent the feet 8 and their opposite ends to form shoulders 9 for snappingly engaging the inturned flanges of a molding.

The stud depicted in FIGS. 4, 5 and 6 is of solid stainless steel construction and includes a circular shank 10 and a circular head 11. The length and diameter of the shank 10 are on the order of .115″ and .120″ respectively and the diameter of the head is on the order of .200″. The stud is welded to a surface of the support 12, for example, the body of a vehicle at the end of the shank 10 remote from the head 11.

The clip 1 is attached to the stud by forcing the former laterally over the stud head 11. Since the head diameter is greater than the distance between the sides 4 of the clip, the latter are cammed apart, with the closed end 3 in effect acting as a hinge, until the stud head 11 snaps into the opposed slots 7 whereupon the clip springs back to its original attitude and the lower portions of the sides 4 bear against the shank 10 of the stud to prevent any lateral movement as viewed in FIG. 4. As best seen in FIG. 5, the length of the slots 7 is approximately equal to the diameter of the stud head 11. Thus, lateral play parallel to the support as viewed in FIG. 5 is limited to an almost negligible extent. The cooperative bearing action against the support 12 of the feet 8 and the tab 5, which acts as a leaf spring, biases the edges of the sides 4 which define the slots 7 tightly against the under surface of the stud head 11.

The molding 13 shown in FIG. 6 is of resilient metal construction, usually stainless steel or aluminum, and includes a body portion 14 and opposed, inturned flanges 15. The molding is attached to the clip by forcing the flanges 15 over the shoulders 9 on the wings 6 which flex inwardly independently of the sides 4 of the clip until the flanges 15 clear the shoulders 9 and thereafter spring back to the position shown in FIG. 6. The edges of the wings below the shoulders 9 bear tightly against the molding flanges 15 to securely retain the molding on the clip. By a comparison of FIGS. 4 and 6, one will observe that the pressure which the molding exerts on the clip tends to pinch the sides 4 inwardly at the open end of the body portion, thereby reinforcing the coupling of the clip to the stud. Thus, the clip will remain securely locked to the stud even under conditions of extreme vibration or shock. A further significant advantage of the clip 1 is that the spring tab 5 renders it self-adjusting to accommodate variations in the spacing of the stud 11 from the support 12. In addition any excess build-up of metal at the base of the stud shank 10 resulting from the welding does not interfere with the attachment of the clip to the stud. These features become evident from a viewing of FIG. 5, wherein one observes the gap between the lower edges of the sides 4 and the surface of the support 12 which allows for a considerable build-up of metal without any interference and also permits some pivotal movement about the feet 8 against the spring tension of the tab 5 to accommodate reasonable variations in the spacing of the stud head from the support.

The reader will, therefore, appreciate that the present invention represents a definite improvement in the art as represented by the prior patents in the field noted above and further that the detailed description of a preferred form of the invention is not to be interpreted in a limiting sense in that the scope of the invention is best defined by the following claims.

I claim:

1. An installation comprising, in combination, a support, a fastener element secured to and extending outwardly from the support, said fastener element having a head disposed in spaced relationship to the support, a sheet metal clip attached to said fastener element, and a trim piece in snapped engagement with said clip, said clip including a generally U-shaped body portion having opposed slots in the sides thereof, the head of said fastener element being seated in said slots, a spring tab extending outwardly from the closed end of said body portion, said tab being tensioned against said support and biasing said body portion against the head of said fastener element, and a plurality of trim piece engaging wings extending outwardly from the end of said body portion remote from said tab, said trim piece being snapped over said wings in flush engagement with said support.

2. An installation according to claim 1 wherein said fastener element is secured to a surface of the support without perforation of said support.

3. An installation according to claim 1 wherein said fastener element is an unthreaded stud having a shank extending from said head which is welded to the support at its end remote from the head.

4. An installation according to claim 1 wherein the body portion of said clip is spaced from the support.

5. A resilient sheet metal clip for securing a trim piece to a supporting panel comprising a generally U-shaped body portion having opposed slots to receive the head of a cooperating fastener element, a spring tab extending outwardly from the closed end of said body portion to bear against the supporting panel and tension said body portion against the fastener element, and a plurality of trim piece engaging wings extending outwardly from the open end of said body portion for snappingly engaging a trim piece pressed over said clip.

6. A resilient sheet metal clip according to claim 5 wherein each of said wings has an irregular polygonal configuration and one side of each of said wings acts as a support-engaging foot.

7. A resilient sheet metal clip according to claim 5 wherein the edges of said wings remote from said body portion are divergent and convergent to provide abrupt shoulders for snap engagement with a trim piece.

8. A sheet metal clip according to claim 7 wherein said convergent edges provide a support for the inturned flanges on a trim piece.

References Cited

UNITED STATES PATENTS

| 3,222,838 | 12/1965 | Sweeney | 52—517 |
| 3,235,929 | 2/1966 | Sweeney | 24—216 |
| 3,239,988 | 3/1966 | Meyer | 52—718 |
| 3,246,440 | 4/1966 | Meyer. | |

EDWARD C. ALLEN, *Primary Examiner.*